US010095847B2

(12) United States Patent
Mallon

(10) Patent No.: US 10,095,847 B2
(45) Date of Patent: Oct. 9, 2018

(54) METHOD, SYSTEM AND DEVICE FOR PROTECTION AGAINST REVERSE ENGINEERING AND/OR TAMPERING WITH PROGRAMS

(71) Applicant: KONINKLIJKE PHILIPS N.V., Eindhoven (NL)

(72) Inventor: Willem Charles Mallon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 11 days.

(21) Appl. No.: 14/400,586

(22) PCT Filed: May 17, 2013

(86) PCT No.: PCT/IB2013/054042
§ 371 (c)(1),
(2) Date: Nov. 12, 2014

(87) PCT Pub. No.: WO2013/175368
PCT Pub. Date: Nov. 28, 2013

(65) Prior Publication Data
US 2015/0161363 A1    Jun. 11, 2015

(30) Foreign Application Priority Data

May 25, 2012   (NL) ...................................... 2008888

(51) Int. Cl.
*G06F 7/04*   (2006.01)
*G06F 21/14*   (2013.01)
(Continued)

(52) U.S. Cl.
CPC ............ *G06F 21/14* (2013.01); *G06F 21/125* (2013.01); *G06F 21/16* (2013.01); *G06F 2221/21* (2013.01)

(58) Field of Classification Search
CPC ........ G06F 21/125; G06F 21/14; G06F 21/16; G06F 2221/21
(Continued)

(56) References Cited

U.S. PATENT DOCUMENTS 6,101,592 A * 8/2000 Pechanek ............ G06F 9/30145
712/20
6,834,343 B1 * 12/2004 Burns ..................... G06F 21/16
382/100

(Continued)

OTHER PUBLICATIONS

Anckaert et al: "Proteus:Virtualization for Diversified Tamper-Resistance"; Proceedings of the ACM Conference on Computer and Communications Security; CCS'06; Proceedings of the ACM Workshop on Digital Rights Management, DRM'06, Jan. 2006, pp. 47-57.

(Continued)

*Primary Examiner* — Gary S Gracia

(57) ABSTRACT

Unauthorized use of computer programs is made difficult by compiling a processor rather than just compiling a program into machine code. The way in which the processor should respond to machine instructions, i.e. its translation data, is computed from an arbitrary bit string B and a program P as inputs. The translation data of a processor are computed that will execute operations defined by the program P when the processor uses the given bit string B as a source of machine instructions. A processor is configured so that it will execute machine instructions according to said translation data. Other programs P' may then be compiled into machine instructions B' for that processor and executed by the processor. Without knowledge of the bit string B and the original program P it is difficult to modify the machine instructions B' so that a different processor will execute the other program P'.

16 Claims, 10 Drawing Sheets

(51) Int. Cl.
*G06F 21/12* (2013.01)
*G06F 21/16* (2013.01)
*G06F 17/30* (2006.01)

(58) Field of Classification Search
USPC ..... 726/26, 27; 713/187, 190, 194; 717/136, 717/139
See application file for complete search history.

(56) References Cited

U.S. PATENT DOCUMENTS

| | | | |
|---|---|---|---|
| 7,385,533 | B2 | 6/2008 | Sawada et al. |
| 7,397,916 | B2* | 7/2008 | Johnson .................. G06F 21/14 380/28 |
| 7,594,221 | B2* | 9/2009 | Bhushan K N ..... G06F 9/45516 717/136 |
| 2002/0116598 | A1* | 8/2002 | Leijten ................ G06F 9/30149 712/207 |
| 2002/0120854 | A1* | 8/2002 | LeVine ................... G06F 21/10 713/189 |
| 2003/0046669 | A1* | 3/2003 | Mohamed ................. G06F 8/52 717/136 |
| 2004/0093505 | A1* | 5/2004 | Hatakeyama ........... G06F 21/12 713/189 |
| 2004/0139340 | A1* | 7/2004 | Johnson .................. G06F 21/14 713/194 |
| 2005/0028132 | A1 | 2/2005 | Srinivasamurthy et al. |
| 2005/0149898 | A1* | 7/2005 | Hakewill ............. G06F 9/30145 716/102 |
| 2006/0136750 | A1* | 6/2006 | Jakubowski ............ G06F 21/14 713/193 |
| 2007/0047758 | A1* | 3/2007 | Pullen ................. G06F 17/2294 382/100 |
| 2008/0028474 | A1* | 1/2008 | Horne ..................... G06F 21/16 726/27 |
| 2008/0127125 | A1* | 5/2008 | Anckaert ................ G06F 21/53 717/136 |
| 2008/0141012 | A1* | 6/2008 | Yehia .................. G06F 9/30036 712/226 |
| 2008/0162949 | A1* | 7/2008 | Sato ........................ G06F 21/14 713/194 |
| 2008/0229115 | A1* | 9/2008 | Wollnik .................. G06F 21/14 713/190 |
| 2009/0254759 | A1* | 10/2009 | Michiels ................. H04L 9/002 713/189 |
| 2009/0313480 | A1* | 12/2009 | Michiels ................. G06F 21/10 713/187 |
| 2010/0017200 | A1* | 1/2010 | Oshikiri ............... G10L 19/005 704/207 |
| 2010/0191959 | A1* | 7/2010 | Czajkowski ............ G06F 21/14 713/155 |
| 2010/0199354 | A1* | 8/2010 | Eker ....................... G06F 21/14 726/26 |
| 2010/0313188 | A1* | 12/2010 | Asipov .................. G06F 21/125 717/139 |
| 2010/0325446 | A1* | 12/2010 | Mordetsky ............ G06F 21/125 713/190 |
| 2011/0035601 | A1* | 2/2011 | Davidson ................ G06F 21/14 713/190 |
| 2011/0283115 | A1* | 11/2011 | Junod ..................... G06F 21/14 713/190 |
| 2012/0159444 | A1* | 6/2012 | Agarwal ............. G06F 11/3624 717/124 |
| 2012/0192283 | A1* | 7/2012 | Gu .......................... G06F 21/14 726/26 |
| 2012/0254982 | A1* | 10/2012 | Sallam .................. G06F 21/564 726/16 |
| 2013/0036314 | A1* | 2/2013 | Glew .................. G06F 12/1408 713/194 |
| 2015/0102474 | A1 | 4/2015 | Kimura |

OTHER PUBLICATIONS

Barat et al: "Reconfigurable Instruction Set Processors: A Survey"; IEEE 2000, 6 Page Document.

\* cited by examiner

METHOD, SYSTEM AND DEVICE FOR PROTECTION AGAINST REVERSE ENGINEERING AND/OR TAMPERING WITH PROGRAMS

CROSS-REFERENCE TO PRIOR APPLICATIONS

This application is the U.S. National Phase application under 35 U.S.C. § 371 of International Application No. PCT/IB2013/054042, filed on May 17, 2013, which claims the benefit of European Patent Application No. 2008888, filed on May 25, 2012. These applications are hereby incorporated by reference herein.

FIELD OF THE INVENTION

The invention relates to a method of providing for the execution of computer programs that supports protection against reverse engineering and/or tampering with the programs and to a device and system for executing programs.

BACKGROUND OF THE INVENTION

Today the Internet provides convenient and ubiquitous access to digital content. Due to the openness of the participating devices (e.g., the PC platform), the use of the Internet as a distribution medium for sensitive content creates the compelling challenge to secure the interests of the content providers. In particular, for the platforms such as the PC or the Android operating system, the user must be assumed to have complete control of the hardware and software that provides access to the content and unlimited amount of time and resources to attack and bypass any content protection mechanisms.

For the uniform execution of applications the internet requires receiving platforms to run a so-called virtual machine (e.g., Java VM). These virtual machines provide an open, uniform, and well documented execution environment. As a consequence, the vulnerability of the internet as a distribution mechanism is amplified since the prevention of reverse engineering of and tampering with applications is difficult.

SUMMARY OF THE INVENTION

Among others it is an object to enhance the protection of applications executed in an open environment against reverse engineering and tampering attacks. The invention is defined by the independent claims; the dependent claims define advantageous embodiments.

According to one aspect a method of configuring a processor is provided, the method comprising
receiving a bit string and a program,
configuring a processor so that the processor executes the program when the processor uses the bit string as a source of machine instructions.

In this way, unauthorized use of further programs for the configured processor is made difficult. Attackers would need to know how the processor is configured, which is difficult as the configuration depends on the program used to configure the processor, and this program may be unknown to the attacker.

The method may be embodied in a compiler that does the reverse of what conventional compilers do: rather than compiling a machine instruction program for a given (virtual) processor from a higher level program, the compiler compiles a (virtual) processor from a machine instruction program and a higher level program. This may be combined with a compiler that compiles further programs from further higher level programs for the compiled (virtual) processor.

In a preferred embodiment, the method comprises translating program into a series of reference machine instructions, and computing translation data, from the bit string and said series of reference machine instructions, for configuring a processor so that the configured processor executes program when the processor uses the bit string as a source of machine instructions; and configuring a processor so that it will execute machine instructions according to said translation data.

The translation data may include data that defines a translation from part of the bit string to operation codes of machine instructions, such as operation codes for add, subtract, load, store and jump operations etc.

Any known method of implementing a virtual machine may be used to configure the processor. For example, software emulation of the configured processor may use techniques known for JAVA virtual machine emulation for example. Also the reference instructions may be instructions for a virtual machine.

As other examples, a processor may be configured by loading data into a look-up table that translates machine instructions into control signals for a processor to make the processor perform the operation, or by configuring a translation circuit such as a programmable logic array to perform that translation, or by manufacturing an integrated circuit with a processing circuit with a logic circuit structure designed to execute the operations corresponding in response machine instructions according to the translation data, or by any other way of supporting a virtual machine.

The configuration of the processor may be cloaked further by iterative application of the configuration.

In an embodiment, the method comprises dividing the bit string into successive parts for use by the processor as respective machine instructions, and determining translations for translating the parts of the bit string into the reference machine instructions at corresponding positions in the series of reference machine instructions. By dividing the bit string into successive parts they may be paired one-on-one to the respective machine instructions in the series. For each pair of part bit string and machine instruction a translation may be devised, e.g., in the form of a look-up table or as part of a Boolean function.

Although it may happen that multiple different bit strings need to be translated to the same reference instruction, this is not problematic. The translation data may simply map multiple different bit strings to the same reference instructions. The reverse situation in which two or more parts of the bit string are the same yet need to be mapped onto different reference instructions may be solved in a number of ways.

For example, one may select the successive parts of the bit string to have a larger length than a length of a reference machine instruction. For example, all reference machine instruction may be a particular number of bits long, whereas all successive parts of the bit string are some larger number of bits long. With each additional bit allocated to the bit string the chance of collisions is reduced.

As a second way to resolve collisions, the method may comprise determining the program counter values corresponding to different parts of the substring when executed by the processor. For example, one may simulate the loading of the program into the reference processor and determine the addresses at which each instruction is loaded. The part corresponding to the reference instruction is determined to have the same program counter value. Before determining translation data from a part to an instruction, the parts of the bit string are combined with information derived from the program counter value so obtaining disambiguated parts. The translation is done from disambiguated parts to the reference machine instructions.

For example, one may concatenate one or more least significant bits of the program counter to the part. For example, one may hash the program counter value into fewer bits and append the fewer bits to the part.

Combining sufficiently much information of the program counter value with the parts will always succeed in disambiguating the parts, at the expense of larger translation data.

The translations may be determined on a smaller scale, for example, the translation data translates different sub-parts of the part into an operation code, operand, and/or result code of the reference machine instruction at the corresponding position in the reference machine program.

For example, the translations needed for a part of the reference instructions may be done separately for operation codes, then the translation may be done per operation code.

It may happen that the number of parts in the bit string is shorter than the number of reference instructions in the program. This may be resolved by padding the bit string (i.e. inserting bits having value zero into the bit string); it may also be resolved by ignoring the bit string for this part and relying only on the program counter. It is preferred however, if number of parts is at least the number of reference instructions. For example, in an embodiment it is required that the number of bits in B is at least as large as the number of reference instructions.

Interestingly, a processor is obtained which when it receives the bit string and applies the translation according to the translation data executes the reference instructions. Moreover, the processor is still programmable and capable of executing arbitrary programs. For example, the method may comprise determining reference machine instructions having no original that translates into the reference machine instruction under the translation defined by the translation data, and selecting originals for said reference machine instructions having no original distinct from the originals that have already been defined in the translation data and extending the translation data for configuring the processor so that the configured processor executes the determined reference machine instructions when the processor uses the selected originals as a source of machine instructions.

The translation data may also be made available to a compiler for the processor configured with said translation data. This allows compiling a further program with the compiler, said compiling producing a program of compiled machine instructions for that processor, and executing the program of compiled machine instructions with said processor.

An aspect of the invention concerns a device for configuring a processor, the device comprising
    a receiver for receiving a bit string and a program
    a configuration processor configured to
        translate the program (P) into a series of reference machine instructions; and
        compute translation data, from the bit string and said series of reference machine instructions, for configuring the processor so that the configured processor executes the program when the processor uses the bit string as a source of machine instructions, and to
    configure a processor so that it will execute machine instructions according to said translation data.

According to one aspect a method of configuring a processor is provided, the method comprising
    providing a bit string B;
    receiving a program P;
    computing operational semantics of a processor that will execute operations defined by the program P when the processor uses the bit string B as a source of machine instructions, the operational semantics being computed from the bit string B and the program P as inputs;
    configuring a processor so that it will execute machine instructions according to said operational semantics.

In this way, unauthorized use of further programs for the configured processor on other processors is made difficult. Attackers would need to determine the operational semantics of the configured processor to do so, which is difficult if the bit string and the program that are used to configure the processor are unknown.

A compiler is provided that does the reverse of what conventional compilers do: rather than compiling a machine instruction program for a given (virtual) processor from a higher level program, the compiler compiles a (virtual) processor from a machine instruction program and a higher level program. This may be combined with a compiler that compiles further program from further higher level programs for the compiled (virtual) processor.

The operational semantics of a processor may include data that defines operations corresponding to operation codes of machine instructions, such as operation codes for add, subtract, load, store and jump operations etc. Any known method of implementing a virtual machine may be used to configure the processor according to given operational semantics. For example, software emulation of the operational semantics may be used using techniques known for JAVA virtual machine emulation for example. As other examples, a processor may be configured by loading data into a look-up table that translates machine instructions into control signals for a processor to make the processor perform the operation, or by configuring a translation circuit such as a programmable logic array to perform that translation, or by manufacturing an integrated circuit with a processing circuit with a logic circuit structure designed to execute the operations corresponding in response machine instructions according to the operational semantics, or by any other way of supporting a virtual machine.

The configuration of the processor may be cloaked further by iterative application of the configuration.

Unauthorized use of computer programs is made difficult by compiling a processor rather than just compiling a program into machine code. The way in which the processor should respond to machine instructions, i.e. its operational semantics, is computed from an arbitrary bit string B and a program P as inputs. The operational semantics of a processor are computed that will execute operations defined by the program P when the processor uses the given bit string B as a source of machine instructions. A processor is configured so that it will execute machine instructions according to said operational semantics. Other programs P' may then be compiled into machine instructions B' for that processor and executed by the processor. Without knowledge of the bit string B and the original program P it is difficult to modify the machine instructions B' so that a different processor will execute the other program P'.

In an embodiment, the method comprises compiling a further program P' with a compiler for the processor with said operational semantics, said compiling producing a program of compiled machine instructions for that processor; executing the program of compiled machine instructions with said processor.

In an embodiment, the program P is a programmable processor simulator program, for simulating a further processor.

In an embodiment, the programmable processor simulator program is obtained by providing a further bit string; receiving a further programmable processor simulator program; computing further operational semantics of a further programmable processor that will execute operations defined by the further programmable processor simulator program when the further programmable processor uses the further bit string as a source of machine instructions, the further operational semantics being computed from the further bit string and the further programmable processor simulator program as inputs.

In an embodiment, the bit string B and the further bit string are mutually different.

In an embodiment, the method comprises receiving an original application A, splitting the an original application A into a first and second parts A1 and A2, using the first part A1 as the program P, and using object code of the second part A2 as the bit string B.

In an embodiment, the method comprises receiving an original application A, splitting the an original application A into a first part A1 and second part A2, using the first part A1 as the program P, combining the second part A2 with a watermark C and using the combination of the second part A2 with the watermark C as the bit string B.

In an embodiment, the resulting processor P is represented as a synthesizable hardware description.

In an embodiment, parts of the bit string B are a representation of a text or sign that asserts an intellectual property right.

In an embodiment, parts of the bit string B are a representation of a text identifying a user.

In an embodiment, parts of the bit string B are collected dynamically from a computing environment.

In an embodiment, any change of the input string will prevent the original application α from working correctly.

An aspect of the invention concerns a computer program product, comprising a program of instructions that, when executed by a computer will cause the computer to receive a program P; compute operational semantics of a processor that will execute operations defined by the program P when the processor uses a bit string B as a source of machine instructions, the operational semantics being computed from the bit string B and the program P as inputs; generate configuration data for configuring a processor so that it will execute machine instructions according to said operational semantics.

BRIEF DESCRIPTION OF THE DRAWINGS

These and other objects and advantageous aspects will become apparent from a description of exemplary embodiments using the following figures

DETAILED DESCRIPTION OF EXEMPLARY EMBODIMENTS OF THE INVENTION

Figure 1:
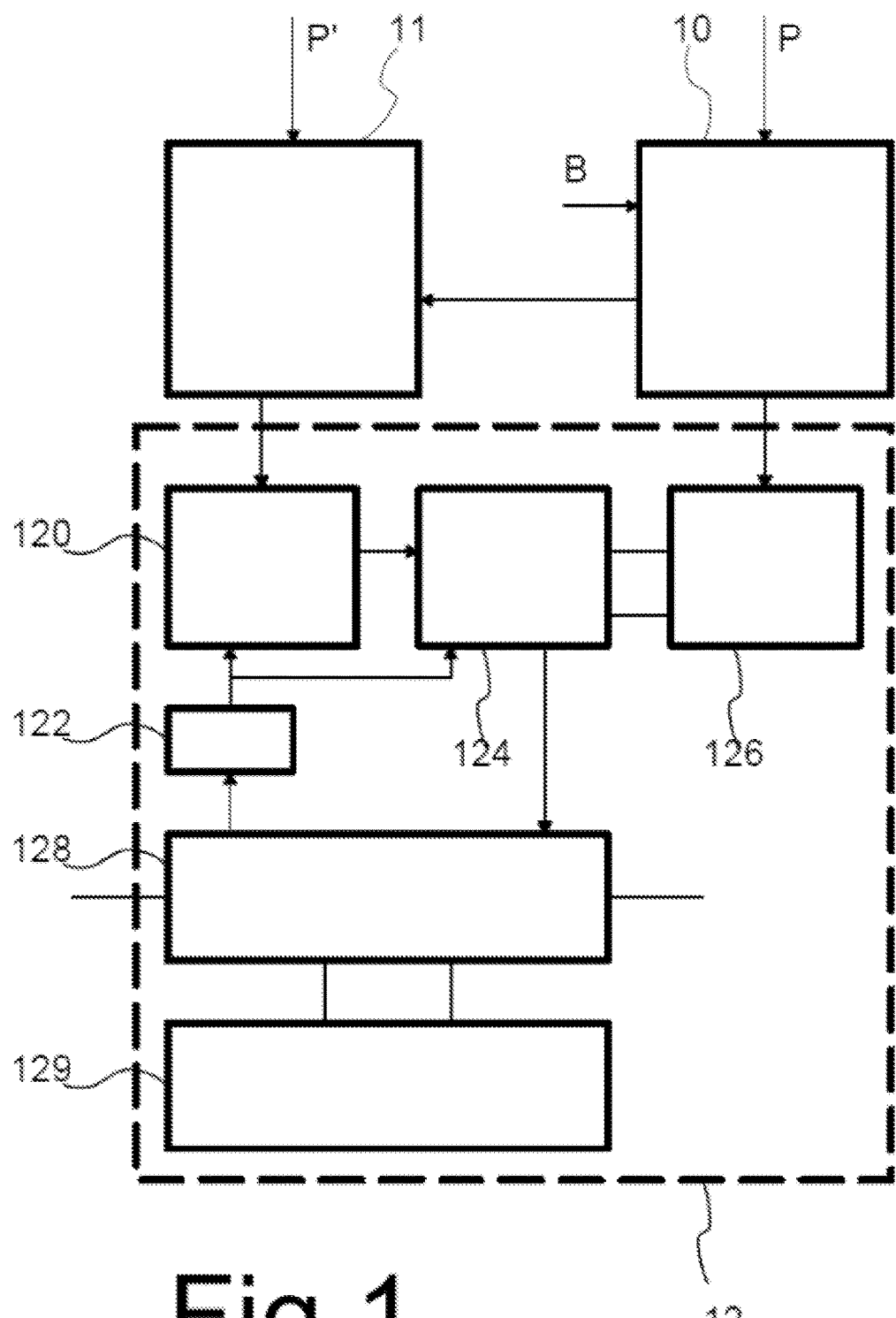
FIG. 1 shows a system for executing programs

FIG. 1 shows an exemplary system for executing programs. It should be emphasized that the illustrated embodiment is provided to illustrate rather than limit the invention. For example the invention may be implemented by other types of processor than the one shown in the figure. The system comprises a configuration compiler 10, a program compiler 11 and a processor 12. Configuration compiler 10 and program compiler 11 may be implemented by means of a computer program running on a computer (not explicitly shown).

Processor 12 comprises a program memory 120, a program counter 122, an instruction decoder 124, an instruction decoding control memory 126. an execution circuit 128 and a data memory 129. Compiler 10 has an input for receiving a program P and outputs coupled to program memory 120 and instruction decoding control memory 126, for storing a machine code program B and data Q that defines the response of processor 12 to instructions from the machine code program B into program memory 120 and an instruction decoding control memory 126 respectively. Instruction decoder 124 is coupled between an output of instruction memory and a control input of execution circuit 128. Program counter 122 has an output coupled to an address input of instruction memory 120 and to instruction decoder 124. Execution circuit 128 is coupled to data memory 129 and to I/O terminals of execution circuit 126.

Configuration compiler 10, program compiler 11 and processor 12 are shown as part of a single system, it should be understood that they do not need to be directly coupled. The processor 12 may load the outputs of configuration compiler 10 and program compiler 11 into processor 12 from a computer readable medium, such as a semi-conductor memory, a magnetic or optical disk etc, when processor 12 has received a command to execute a program, or it may be loaded earlier, for example as early as during manufacture of processor 12. Configuration compiler 10 and program compiler 11 may write the output data directly on the computer readable medium or it may subsequently be transmitted and/or copied any number of times before it reaches processor 12.

Processor 12 provides for translation of machine instructions from program memory 120 into control codes for execution circuit by instruction decoder 124, dependent on data from instruction decoding control memory 126. In an embodiment a machine instruction contains an operation code (op code) and optionally one or more operand codes. The operand codes may identify addresses of registers with input data for an operation indicated by the operation code and addresses of registers where output data from the operation must be stored. Instead of addresses, the operand codes may indicate literal data or addresses of registers that store addresses of operand data. In an embodiment the translated control codes may similarly have an operation code and operand codes, to be interpreted and executed by execution circuit 128, but alternatively the control codes may be microcode for directly controlling components of execution circuit 128.

Different types of processors may require use of different op codes to indicate the same operation, and they may require different ways of indicating operand data and result storage locations. The interpretation that a specific type of processor will give to instructions, that is, the way in which it will respond to individual instructions will be called the operational semantics Q of this type of processor. As used herein, operational semantics refers to data that defines how processor 12 will respond to machine instructions. Different types of processor may have different operational semantics Q and Q'. The symbol Q will also be used to refer to a processor that has the operational semantics Q, i.e. when that processor is configured to execute instructions consistent with the operational semantics Q.

Figure 2:
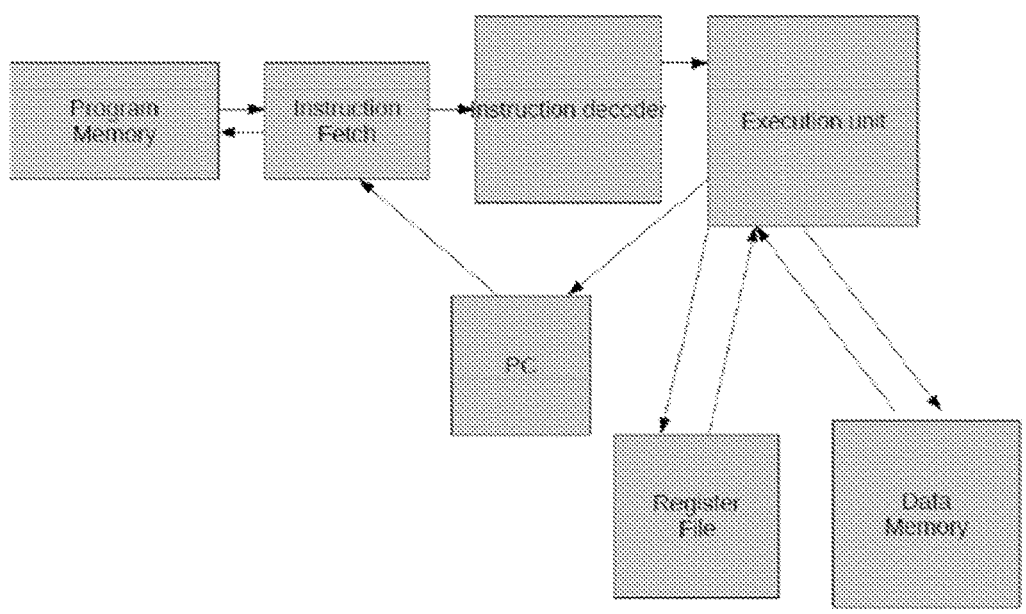
FIG. 2 illustrates a processor architecture
Figure 3:
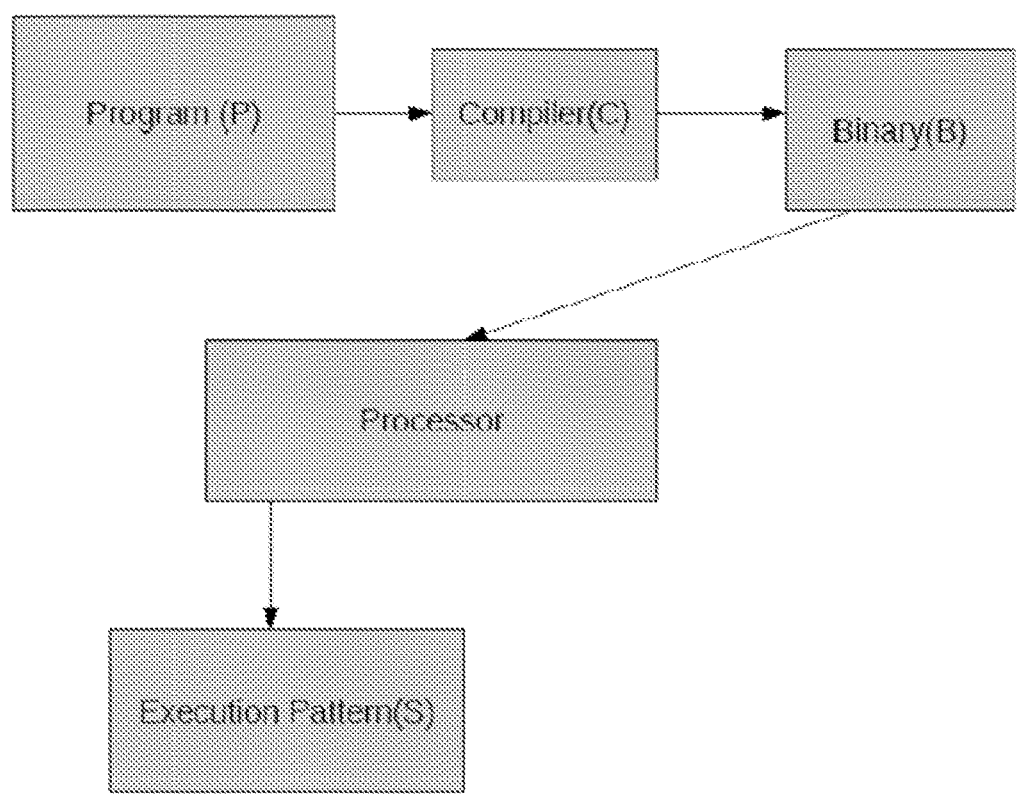
FIGS. 3-8 illustrate metamorphic compilation
Figure 4:
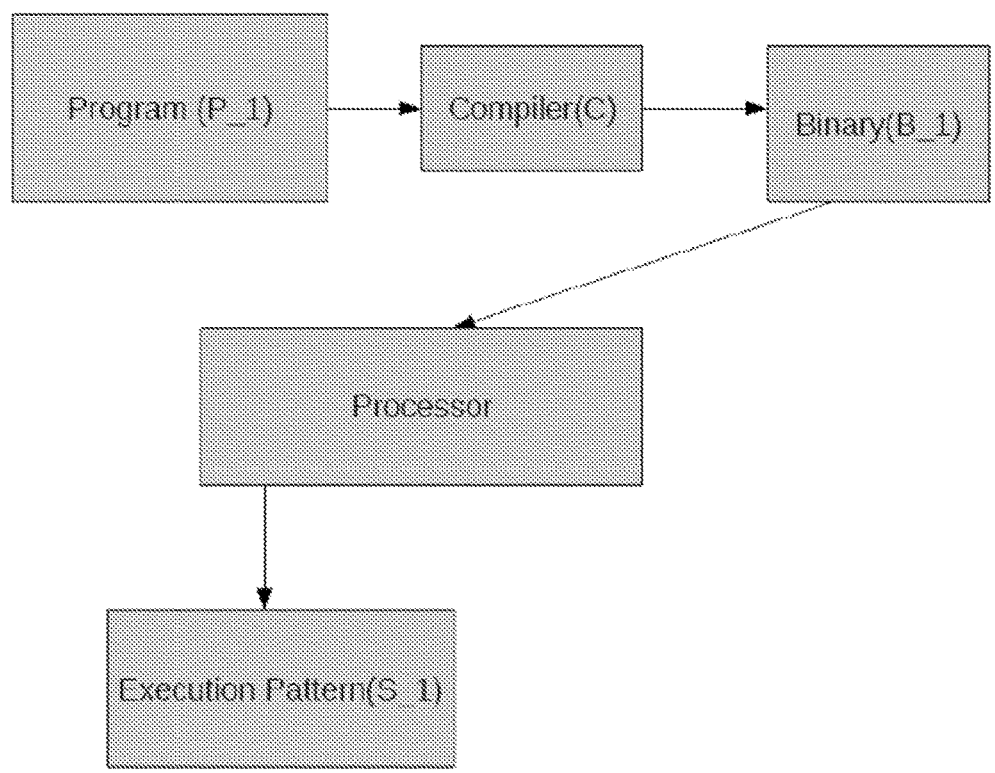

FIG. 2 illustrates a more general processor architecture, comprising a program memory, an instruction fetcher, an instruction decoder, an execution unit, a program counter (PC) a register file and a data memory. The instruction fetcher receives a program counter value, and fetches a bit pattern from the program memory. This bit pattern (the instruction) is supplied to the instruction decoder. The instruction decoder generates the execution bits to steer the execution unit. These execution bits may contain things as complex as a micro instruction and as simple as a unary encoding for the register index. The execution unit executes the execution bits, that is, it performs operations under control of these bits. Under control of the execution bits, the execution unit may fetch data from register file/program memory and update the program counter.

The instructions that are held in Program Memory are often referred to as 'Machine Code'. They are bit patterns that often have a 1-to-1 relation with assembly instructions. They lead to a pattern of executions in the execution unit. This pattern of executions determines the execution behavior of a program. We call the pattern of executions the semantics of the program.

In the example of FIG. 2, the operational semantics Q may be defined by the instruction decoder and/or the execution unit. In the example of FIG. 1, the operational semantics Q may be adaptably defined by information stored in instruction decoding control memory 126.

The Instruction decoder 124 may translate binary patterns for example by using the operation code of an instruction received from instruction memory 120 to look up a translated operation code in instruction decoding control memory 126, for supply to execution circuit 128. The original operation codes and the translated operation codes may have the same length, e.g. eight bits, but this is not necessary: the original operation codes may be longer than the translated operation codes or, as will be explained even shorter. Similarly Instruction decoder 124 may translate operand and result register addresses, literal data and/or other data from the received instruction by using part of the received instruction to look up translated addresses or data in instruction decoding control memory 126, for supply to execution circuit 128. The original operand/result addresses/data and translated operand/result addresses/data have the same length, but as in the case of the operation codes this is not necessary.

Program compiler 11 may be a conventional compiler, configured to support compilation in a compilation mode wherein compiler 11 translates a program P' into a sequence of machine instructions for a specifically configured processor 12 for storage in instruction memory 120. Configuration compiler 10 is configured to support a compilation mode wherein it inputs a machine code program B and a program P generates data Q that defines the response of processor 12 to instructions in the second compilation mode. In this compilation mode, configuration compiler 10 stores the operational semantics Q as data that defines the response of processor 12 to instructions in instruction decoding control memory 126.

Basic Principle of Metamorphic Compilation

A programmable device, such as a processor, can run a large variety of software programs. The number of programs that can possibly be run is usually only bounded by resource limitations such as the available time and memory. Programs that run on processors are encoded as bit-patterns, that are interpreted by the processor. In an exemplary embodiment a bit pattern comprises a sequence of machine instructions. Compilers transform high-level descriptions of programs into these bit-patterns. High-level descriptions are usually created using programming languages such as C, Java, Fortran. Crucial in this transformation is that the processor's interpretation of the bit-pattern is equal to the meaning of the high-level program according to the programming language specification. In other embodiments, the compilers may transform a lower level program, such as an assembly level program or a program for a virtual machine, such as a program of JAVA byte codes.

If we call the original program P, the bit-pattern B, the language standard interpretation (or denotational semantics) M and the processor's interpretation (or operational semantics) Q, a correct compiler must establish:

$$M(P)=Q(B)$$

Thus, given P and M, a correct compiler C will create a bit-pattern B=C(P) that satisfies the above equality. In other words, execution of the program B must produce a processor response to input data as defined by the program given the language standard interpretation. The equality $M(P)=Q(B)$ may be satisfied for example if all instructions at corresponding positions in the bit string B and in a translation of the program P into a reference machine language program have operation codes OB, OP that satisfy $M(OB)=M(OP)$, i.e. that these instructions refers to the same operation and that there is a one to one map between storage locations indicated by operand/result codes in the instructions and/or the literal data is equal.

Note that M depends on the programming language. A program P can have a different meaning for different programming languages. Similarly, Q depends on the actual processor executing an application. The same bit-pattern may have different results when executed by different processors. For instance, a bit-pattern that is interpreted as a web-browser by an Intel-processor may not have a valid interpretation on an ARM-processor. For different types of processors, which have different operational semantics Q and Q' different bit patterns B and B' are usually needed, which meet the conditions that $M(P)=Q(B)$ and $M(P)=Q'(B')$.

For conventional compilers, we usually find that M and Q are fixed and B is computed for a given P. Sometimes M is fixed, and a tool generates custom hardware Q and accompanying bit-pattern B, such that the equation holds. By changing B, new programs P can be run on hardware Q, but the choice of these programs is limited to the extent that the generated Q can only interpret a few bit-patterns. In this case we speak of a customized non-programmable design.

In metamorphic compilation P and B are fixed, and Q is generated. Thus a metamorphic compiler creates a processor that will interpret a given bit-pattern B as the program P. This could be easily achieved by generating customized hardware that ignores B. In contrast to a non-programmable design, a metamorphic compiler generates a processor Q that is programmable in the sense that the range of applications that can be executed by processor Q is only bound by memory and time resources.

The processor Q generated during metamorphic compilation can either be a virtual machine that is emulated on another execution platform, or it could be a hardware design, e.g., represented by synthesizable Verilog or VHDL. To support this approach a metamorphic compiler will also generate a compiler CQ that will compile arbitrary programs P' written in the programming language accepted by CQ to execute on processor Q.

In summary we can compare metamorphic compilation to classic hardware and software compilation as follows:

- software compilation generates a bit-pattern for an arbitrary program and a fixed processor
- hardware compilation generates a bit-pattern and a processor for a fixed application
- metamorphic compilation generates a processor and a compiler for a fixed bit-pattern and an arbitrary program This will be illustrated using FIGS. 3-8. Let "P" be a program. Let "B" be the binary image created by a compiler "C" for that program in instruction memory. Let "S" be the pattern of executions in the execution unit that are induced by "B". (see FIG. 3)

Let "P_1" be a different program. The same compiler "C" will transform "P_1" into a different binary "B_1". This binary will induce new pattern of executions "S_1" in the same processor. (see FIG. 4)

Figure 5:
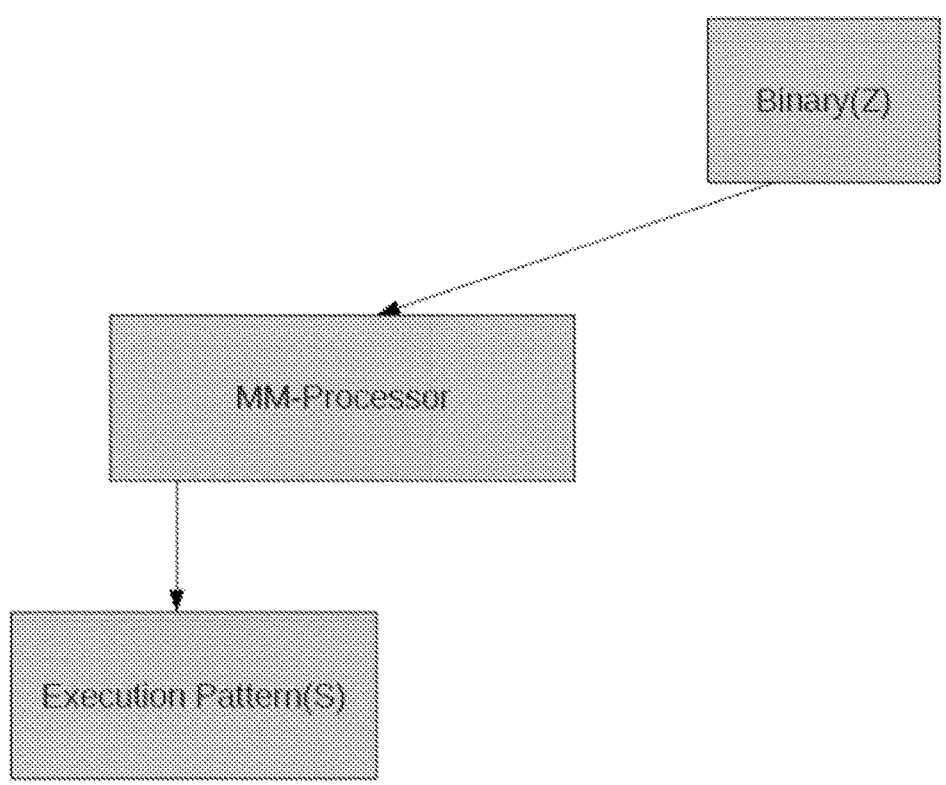
Figure 6:
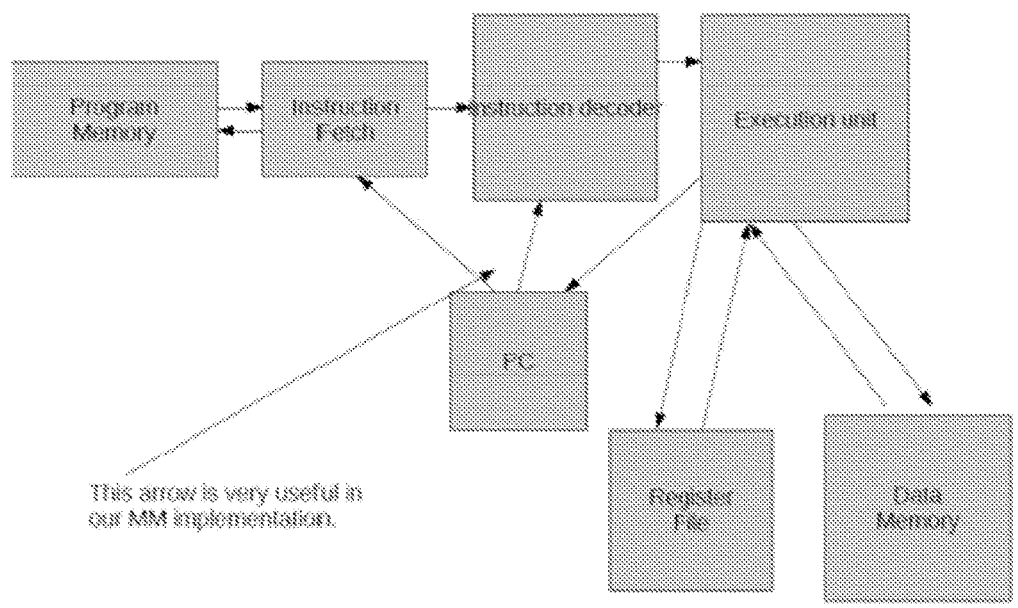
Figure 7:
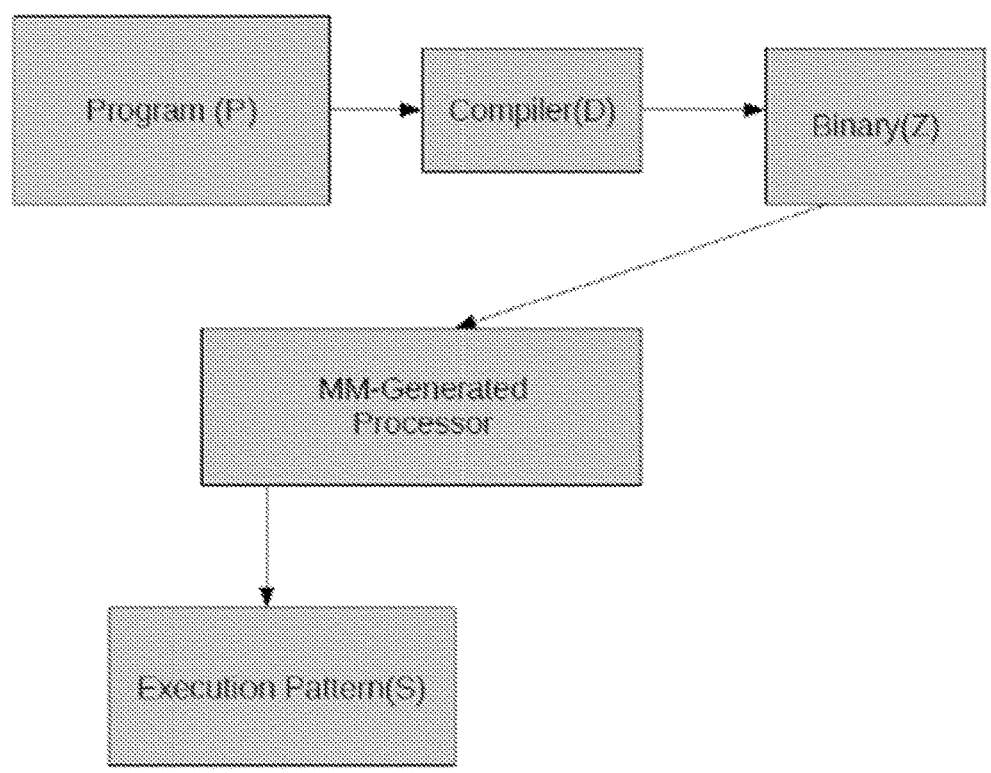

In Metamorphic compilation we replace the instruction decoder of FIG. 2. Let "Z" be a binary pattern chosen by the user. This can be any binary pattern, for example a pattern representing a picture, a text-file, or any other data. We will replace the instruction decoder in FIG. 2 with a different decode decode_2 such that decode_2 reads from instruction memory and produces execution bits. The bits that decode_2 generates from an instruction memory containing "Z" are equal to the execution bits that are generated by the original instruction decoder for binary image "B". Hence the execution patterns induced by "Z" are the same as the execution patterns induced by "B". "MM_processor" in FIG. 5 is the processor that uses the new instruction decoder. It is not necessary to generate precisely the same execution bits, as long as the generated execution patterns are equivalent. In our example implementation we generate the same execution bits.

Since "Z" is chosen by the user, it can be anything, for instance a memory that contains just "0". In order to be able to generate the same sequence of execution bits, the instruction decoder may use the Program Counter bit pattern (which is unique for every instruction in the program memory (it is the instruction address)) to generate the proper execution bits. This means that the processor template that we use uses the program counter in the decode unit. See FIG. 6.

decode_2 is able to generate a wide variety of execution bit patterns. The processor that is built using decode_2 is still programmable. A compiler can be created that generates bit-patterns for program memories, similar to a regular compiler in FIG. 2. This new software compiler (D) will compile original program "P" into bit pattern "Z". See FIG. 7.

Figure 8:
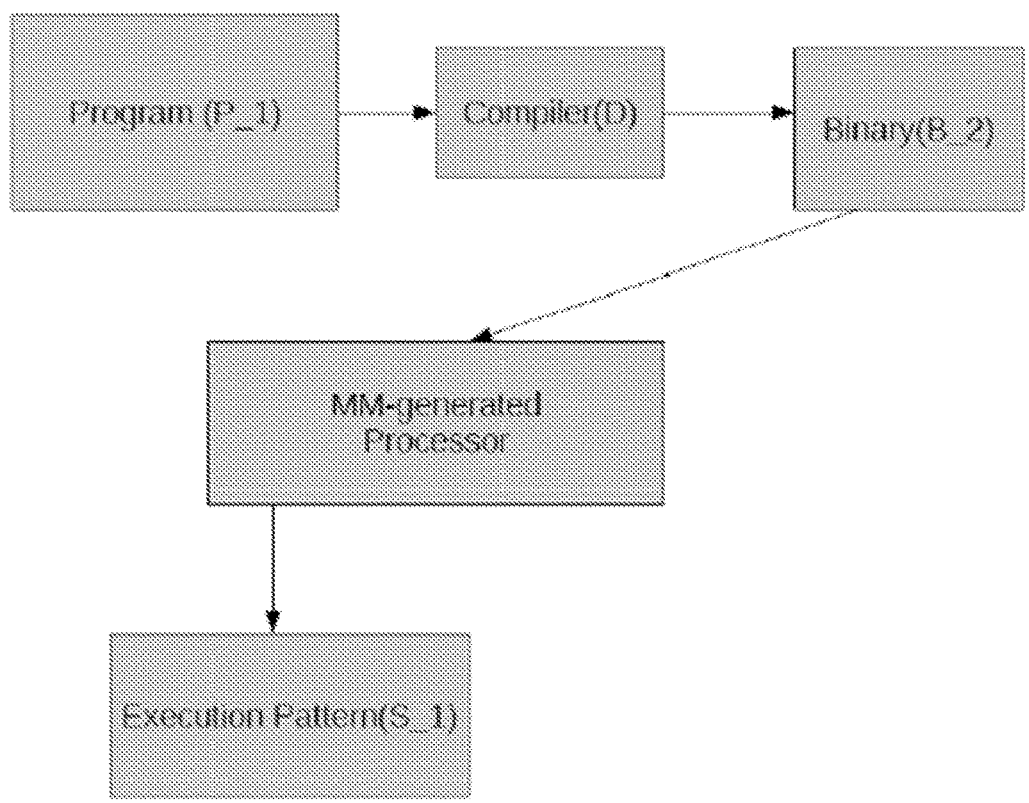

It will also be able to compiler program "P_1" into a new binary (say "B_2") that induces the same execution pattern "S_1" that we saw earlier. (FIG. 8)

An exemplary embodiment of Metamorphic Compilation

In an embodiment that uses a processor of the type described by reference to FIG. 1, configuration compiler 10 may implement metamorphic compilation in a series of steps. In a first step, configuration compiler 10 may translate the program P into a series of reference machine instructions for a reference execution circuit. In a second step, configuration compiler 10 may divide the input bit string B into successive parts that will each be used as a respective machine instruction.

In a third step, configuration compiler 10 may compare reference machine instructions with parts of the bit string B at corresponding positions in the series of reference machine instructions and the bit string B respectively. From this comparison configuration compiler 10 determines the translations needed to translate the parts of the bit string into the reference machine instructions at the corresponding positions. For example, different sub-parts of the part may be compared with an operation code and operand and result codes of the reference machine instruction at the corresponding position in the reference machine program. From this, look-up data for the information from the bit string B in the sub-parts may be extracted from the reference machine instructions. In a fourth step, configuration compiler 10 causes the resulting information, e.g. the look-up data to be made available to program compiler 11, so that program compiler 10 is configured to compile programs P' for a processor with the generated operational semantics. In a fifth step, configuration compiler 10 causes the resulting information, e.g. the look-up data to be stored in instruction decoding control memory 126.

In an embodiment, sub-parts are used that do not overlap. But it is also possible to use overlapping sub-parts. For example, certain operations in the reference machine instruction program may contain a particular register operand. Then configuration compiler 10 may search for all parts ('B-instructions') in the bit string B that require that particular register operand, by examining the corresponding reference machine instructions. Configuration compiler 10 may generate a look-up table that indicates for the corresponding instruction in the reference machine program whether an instruction in 'B' does or does not require this particular operand (or possibly doesn't care). Instead of the look-up table configuration compiler 10 may derive a boolean formula that, when applied to the corresponding instruction in the reference machine program, results in an indication whether this particular operand is required or not. Methods of generating a boolean formula on the basis of a loop-up table are known per se. During execution of the program, this boolean formula can be applied to every part ('B-instruction') of B, or the parts can be used as input for the look-up table, to determine whether that instruction does or does not require the operand. The boolean function requires a sub-part of a part of B as input. Other boolean functions may be derived to determine other aspects of instructions (the operation code for instance) using different (but possibly over-lapping) sub-parts of a part of B.

Dependent on the content of the program P and the bit string B, ambiguity may arise, in that the same content in different sub-parts of bit string may need to be translated in different ways. Configuration compiler 10 may resolve such ambiguities in various ways. In one embodiment, compiler may increase the length of the parts of the bit string B that will be treated as instructions and optionally the length of the sub-parts that will be used as operation codes or operand/result data/addresses to avoid such ambiguities, or reduce their number.

In an embodiment instruction decoder 124 may be configured to use program counter values to disambiguate the translation. For example, instruction decoder 124 may be configured to supply information derived from the program counter value in combination with a part or parts of an instruction from instruction memory 120 to look-up a translation. Compiler 10 may be configured to determine the program counter values corresponding to different parts of the substring, to select the translation of different combinations of data from parts of the bit string B and information derived from the program counter value.

In a further embodiment, instruction decoder 124 may provide for a configurable extraction of the information from the program counter. In this embodiment, configuration compiler 10 may be arranged to select a configuration of instruction decoder 124, in order to define the information that will be used. For example, compiler 10 may collect all different translations that should be given to a same sub-part of the bit string B, select one of a plurality of predetermined ways of deriving information from program counter values that provides sufficient information to disambiguate these translations and cause instruction decoder 124 to be configured to use the selected way of deriving information. A way of deriving information that satisfies this condition and requires a minimum amount of information may be selected. For example different ways of deriving information may use different numbers of variable least significant bits of the program counter value.

A similar disambiguation may be applied to a plurality of sub-parts of the bit string B that have ambiguous translations. Configuration compiler 10 may use a trade-off between using longer parts of the bit string B as instructions and using more of the program counter for disambiguation. Furthermore, the amount of ambiguity may be reduced by using only a part of the program P to define the translation and by using conventional compilation for the remainder of the program.

Of course, some possible reference machine instructions, operation codes or operand codes will have no original that translates into the possible reference machine instruction. This is not a problem for the program P, when these possible reference machine instructions, operation codes or operand codes do not occur in the machine program for that program. But for executing other programs arbitrary originals may be selected for these machine instructions, operation codes or operand codes, as long as they are distinct from the originals that have already been selected. Optionally, such originals may be selected based on unused parts of the bit string B.

In this way, the operational semantics Q of a processor (the processor with this operational semantics also referred to as the processor Q) may be defined based on a program P and a bit string B. Although an example of operation of configuration compiler 10 has been given in the context of the system of FIG. 1, it should be noted that other embodiments are possible. For example, the translation of instructions may be performed under software control, that is, emulation may be used. In this case the function of instruction decoder 124 and instruction decoding control memory 126 may be implemented by an emulation program. As another example, compiler 10 may be configured to generate a hardware design, e.g. represented by synthesizable Verilog or VHDL description, of the processor that will execute the series of reference machine instructions in response to receiving successive parts of the bit string B.

Although an example has been described wherein the bit string B is received, it should be appreciated that alternatively configuration compiler 10 may generate bit string B, for example by means of random generation or as a translation of a further program P' different from the program P.

Summarizing, the bit string B is used to determine operational semantics Q from a program P with the property that if a processor with the operational semantics Q executes a series of instructions taken from the bit string B the processor will effectively execute the program P. This may also be said to configure program compiler 11, that is, to create a specific compiler CQ for translating any program P' according to the operational semantics Q, or in other words, a specific compiler that will translate any program P' into machine instructions that, when executed by the processor with the operational semantics will cause that processor to perform the processor will effectively execute the program P'.

Application of Metamorphic Compilation for Tamper Resistance, Obfuscation and Watermarking Two things happen when morphing an application A into a processor Q using an arbitrary bit-pattern B such that the interpretation of B by the processor Q is semantically equivalent to an application A. Firstly, the representation of the processor Q (a virtual machine or a piece of hardware) and the binary object B are inextricably bound, meaning that neither Q nor B can be changed without destroying the original application A. Secondly, the encoding of the original algorithm A is now split into two parts. One part of the algorithm is encoded using the bit-pattern B, another part is encoded in the processor Q.

The processor Q is programmable. As a consequence, for any arbitrary application, a compiler CQ will generate code such that the interpretation by Q will be an implementation of this arbitrary application. Therefore, studying the representation of Q in isolation, will not reveal any information about the original application A. Also studying the bit-pattern B will not reveal any information about the application A since B was chosen randomly. To learn anything about the original application A an attacker has to derive the instruction set and architecture of processor Q by observing the execution trace of program B executed by Q. This is a much harder challenge than reverse-engineering an application executed on an open platform.

The fact that the bit-pattern B can be chosen freely and is inextricably bound to processor Q and cannot be changed without destroying the original application means that it is possible to use B as a watermark. For instance, it is possible that B includes (among other information) the logo and copyright text of the licensor, or the name and organization of the licensee. In this way the original application is not only obfuscated but inextricably bound to a legal text stating the rights of the legal owner and licensee.

Another attractive application of metamorphic compilation is to obfuscate part of an application and to make the remainder tamper free. To achieve this we split the original application A into two parts A1 and A2, such that A1 contains all code that we want to obfuscate (e.g., to hide license checking code or to prevent reverse-engineering of a proprietary algorithm). We apply metamorphic compilation using A1 as the program P to morph A1 into the virtual machine Q, using the object code of A2 as program-code. The implementation of A now consists of two parts: one part is a simulator of the virtual machine Q using the object-code of A2 as program-code, resulting in an obfuscated implementation of part A1. The second part A2 is implemented as standard object code for the host platform of application A.

The object code of A2 serves now both as code for the host machine as well as code for the virtual machine Q responsible for executing the application part A1. Although an attacker may be able to reverse-engineer the object code of application part A2 changing it will also change the behavior of the implementation for application part A1. As a result, it is no longer possible to change software locally without affecting the complete application. This makes an attack on morphed applications difficult.

In addition to combining obfuscation and tamper-resistance, also watermarking can be used for the application. This is done by again splitting the original application program A into two parts A1 and A2, such that A1 contains all code that we want to obfuscate and A2 contains the code that we want to make tamper-resistant only. We can use the metamorphic compilation to morph A1 into the virtual machine Q, using the object-code of A2 combined with watermark C as program-code. As described before the implementation of program part A1 is now obfuscated, program part A2 is made tamper-resistant, and watermark C is added, which cannot be removed or changed without disrupting the execution of application part A1.

A more involved use of metamorphic compilation is the layered self-application. One result of metamorphic compilation is the virtual machine Q which will be able to execute the arbitrary bit-pattern B. The virtual machine Q itself is implemented by a program PQ. It is now possible to apply metamorphic compilation on the program PQ using either the bit-pattern B or yet another freely chosen bit-pattern. This process can be applied several times using freely chosen binary patterns. Each layer will enhance the obfuscation and tamper resistance, and allows to apply different watermarks.

In summary, metamorphic compilation allows to:
Add watermarks to programs that cannot be changed or removed
Use different levels of protection for different parts of an application.
  To prevent that an attacker can change the implementation, an application part can be made tamper-resistant.
  To prevent that an attacker can change the implementation and understand/reverse-engineer the implementation, an application part can be obfuscated.

We propose the method of metamorphic compilation as a means to enhance the protection of applications executed in an open environment against reverse engineering and tampering attacks. Metamorphic compilation may be use to achieve one or more of the following: (a) obfuscating program execution by layering (multiple) virtual machines (b) inextricably link application and execution environment, and (c) embedding legal information openly into application code, virtual machine, and application data. The nature of metamorphic compilation ensures that altering either virtual machine, application, or application data will render the application useless.

Figure 9:
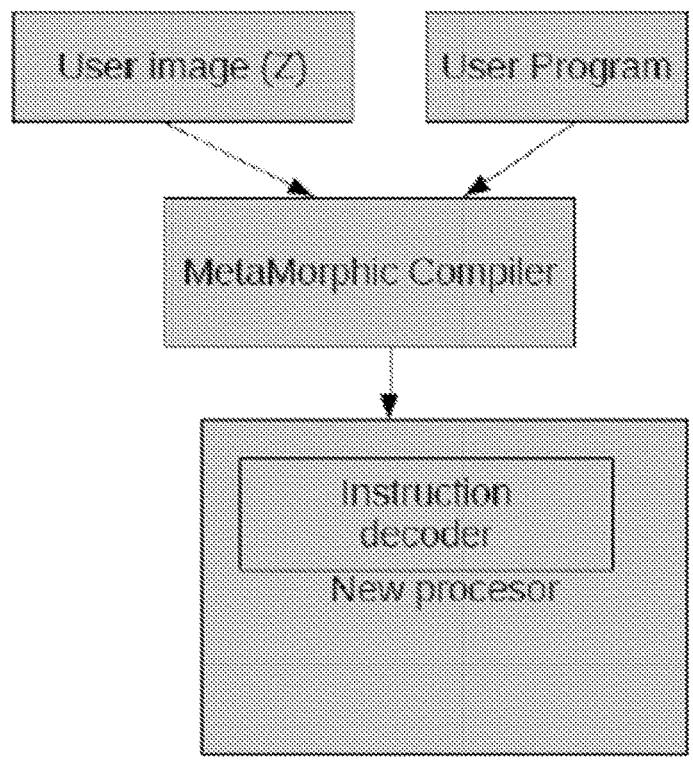
FIGS. 9-11 illustrate a further embodiment

FIG. 9 shows how the metamorphic compiler takes a user specified image "Z", and a user specified program "P". The program "P" would ordinarily be compiled into bit pattern "B" (not shown) that would induce execution pattern "S" in our regular processor.

Figure 10:
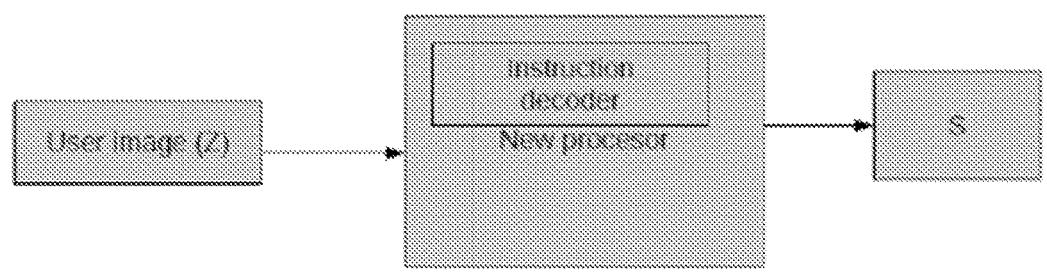

FIG. 10 shows how execution pattern "S" is induced in the metamorphic processor by binary image "Z".

If our metamorphic compiler generates a software implementation of the new instruction decoder, then that software implementation, together with a software implementation of the rest of the processor forms a Program. This program induces an execution pattern "NS" on our processor.

The metamorphic compiler can generate a new decoder_2 such that the original user image will induce the execution pattern "NS" on the processor_2.

Figure 11:
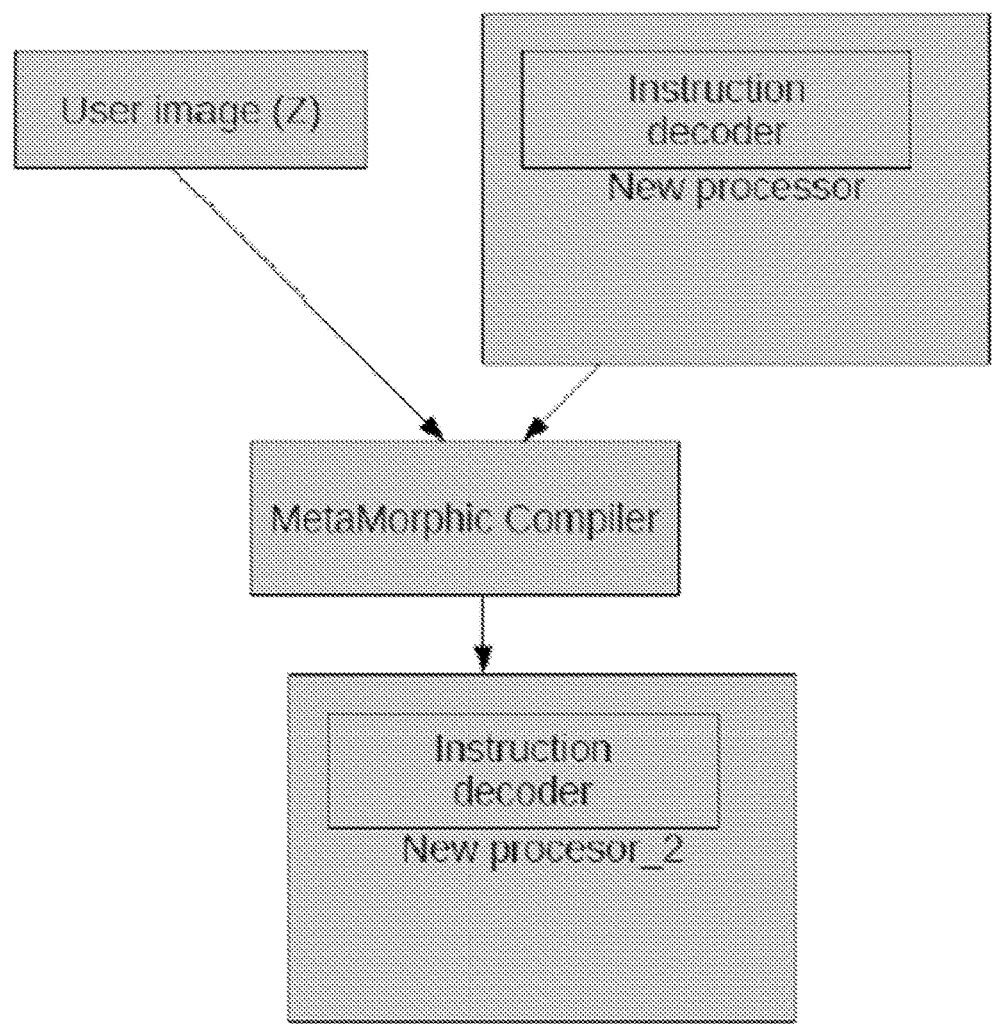

As illustrated in FIG. 11 processor_2 may execute image "Z" and induce execution pattern "NS" which is a simulator for processor_1 which executes image "Z" and induces pattern "S" which is the execution pattern that we associate with our user program "P".

Since we are executing on a single platform, execution patterns "N" and "NS" are interwoven on that platform.
Formal Notation Formally this may be specified with the following notation. Applications are denoted by Greek letters $\alpha$, $\beta$, $\gamma$ and refer to the source code representation of the application in any programming language. A programmable processor is denoted by capital letters Y, Z etc. A string used as input by a programmable processor is represented by lower case letters a, b, and c. The denotational semantics of an application $\alpha$ according to the language standard is referred to by the term $M(\alpha)$. The operational semantics of a binary a executed on processor Y is represented by the term $MY(a)$. The term $CY(\alpha)$ is a representation of a binary generated by compiler C for the processor Y with $MY(CY(\alpha))=M(\alpha)$.

In this notation, given an application $\alpha$ and an arbitrary string a, a programmable processor Y and a compiler CY and are generated with the following properties: $MY(a)=M(\alpha)$. For arbitrary applications $\beta$, the compiler CY will generate a string $CY(\beta)$ such that $MY(CY(\beta))=M(\beta)$.

In an embodiment the application $\alpha$ is a programmable processor simulator Z, resulting in a processor Za and corresponding compiler. In a further embodiment the resulting programmable processor Y is derived by applying the derivation step an arbitrary number of times.

As used herein the term operational semantics of a processor includes data that defines operations corresponding to operation codes of machine instructions, such as operation codes for add, subtract, load, store and jump operations. This data may define further operation codes of an actual processor or a processor simulation program to be used to cause the actual processor or simulation program to operate according to the operation codes, and the data may include sets of circuit control signal values for use in an execution circuit, to be used to cause the execution circuit to operate according to the operation codes. As used herein configuring a processor so that it will execute machine instructions according to said operational semantics includes storing such data to a processor and/or manufacturing a processor with an automatically generated circuit configuration that will make it operate according to such data and/or generating a simulation program for simulating a processor that responds to the operation codes according to the data. As used herein machine instructions are instructions that can be individually executed by a processor or a processor simulation program, including for example add, load, store and jump instructions.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A method to enhance the protection of applications executed in an open environments against reverse engineering and tampering attaches in processing circuit, the method, configuring said processing circuit to be a virtual machine emulated on another execution environment, wherein the method obfuscates program execution by layering at least one virtual machine, an inextricably link application and execution environment and embedding legal information openly into at least application code, said virtual machine and application data, said method comprising:
- receiving a bit string (B) and a program (P),
- translating the program (P) into a series of reference machine instructions for a reference execution circuit using a complier;
- dividing the bit string (B) into successive parts that will be used by the processor circuit as respective machine instructions;
- comparing the reference machine instructions with the parts of the bit string (B) at corresponding positions in the series of reference machine instructions and the bit string (B) respectively;
- determining translation data for translating the parts of the bit string into the reference machine instructions at the corresponding positions based on said comparison,
- wherein said translation data is associated with said processor circuit;
- configuring the processor circuit with said translation data, wherein an instruction decoder of the processor circuit is configured to provide for translation of machine instructions from the bit string (B) into the reference machine instructions when the processor uses the bit string (B) as a source of machine instructions.

2. The method according to claim 1, wherein the translation data translates different sub-parts of the part into at least one of an operation code, operand and a result code of the reference machine instruction at the corresponding position in the reference machine program.

3. The method according to claim 1, wherein the translation data comprises look-up data for looking up the parts of bit string (B) to obtain a reference machine instruction.

4. The method according to claim 1, wherein the successive parts of the bit string have a larger length than a length of a reference machine instruction.

5. The method according to claim 1, comprising:
- determining the program counter values corresponding to different parts of the bit string when executed by the processor,
- combining the parts of the bit string with information derived from the program counter value so obtaining disambiguated parts and determining translations for translating the disambiguated parts into the reference machine instructions.

6. The method according to claim 1, comprising:
- determining reference machine instructions having no original that translates into the reference machine instruction under the translation defined by the translation data,
- selecting originals for said reference machine instructions having no original distinct from the originals that have already been defined in the translation data and extending the translation data so that the configured processor circuit executes the determined reference machine instructions when the processor uses the selected originals as a source of machine instructions.

7. The method according to claim 1, comprising:
- making the translation data available to a compiler for the processor circuit configured with said translation data,
- compiling a further program (P') with the compiler, said compiling producing a program of compiled machine instructions for said processor circuit;
- executing the program of compiled machine instructions with said processor circuit.

8. The method according to claim 7 where the program (P) is a processor simulator program, for simulating a further processor,
- where the processor simulator program is obtained by
  - receiving a further bit string and a further programmable processor simulator program; and
  - computing further translation data of the further processor that will execute operations defined by the further programmable processor simulator program when the further processor uses the further bit string as a source of machine instructions, the further translation data being computed from the further bit string and the further programmable processor simulator program as inputs.

9. The method according to claim 1, comprising:
- receiving an original application A,
- splitting the original application A into a first part A1 and a second part A2, using the first part A1 as the program (P) and using object code of the second part as the bit string (B).

10. The method according to claim 1, comprising:
- receiving an original application A, splitting the original application A into a first part A1 and a second part A2, using the first part A1 as the program (P), combining the second part A2 as a watermark C and using the combination of the second part A2 with the watermark C as the bit string (B).

11. The method as in claim 1 wherein the processor circuit is represented as a synthesizable hardware description.

12. The method as in claim 1 wherein parts of the bit string (B) are at least one of a representation of a text, sign and information collected dynamically from a computed environment.

13. The method as in claim 1 where any change of the input string will prevent the original application from working correctly.

14. A device for configuring a processor circuit to enhance the protection of applications executed in an open environments against reverse engineering and tampering attacks by configuring said processor circuit to be a virtual machine emulated on another execution environment, wherein program execution is obfuscated by layering at least one virtual machine, an inextricably link application and execution environment and embedding legal information openly into at least application code, said virtual machine and application data, the device comprising:
- a receiver configured to receive a bit string (B) and a program (P), the program (P) defining a series of reference machine instructions associated with the processor circuit; and
- a configuration processor circuit configured to:
  - translate the program (P) into a series of reference machine instructions for a reference execution circuit using a computer;
  - divide the bit string (B) into successive parts that will be used by the processor as respective matching instructions;
  - compare the reference machine instructions with the parts of the bit string (B) at corresponding positions in the series of reference machine instructions and the bit string (B) respectively;
  - determine translation data for translating the parts of the bit string into the reference machine instructions at the corresponding position based on said comparison,
  - wherein said translation data is associated with said processor circuit, and configuring the processor circuit with said translation data, wherein an instruction decoder of the processor circuit is configured to:
provide for translation of machine instructions from the bit string (B) into the reference machine instructions dependent on the translation data so that it will execute machine instructions according to said translation data.

15. A processor circuit configured to be a virtual machine, emulated on another execution environment, to enhance the protection of applications executed in an open environments against reverse engineering and tampering, wherein execution is obfuscated by layering at least one virtual machine, an inextricably link application and execution environment and embedding legal information openly into at least application code, said virtual machine and application data comprising:
   a program memory configured to store a bit string (B) as a source of machine instructions,
   an instruction decoder coupled to an output of the program memory, the instruction decoder configured to:
   divide the bit string (B) into successive parts that will be used by the processor circuit as respective machine instructions;
   compare the reference machine instructions with the parts of the bit string (B) at corresponding positions in the series of reference machine instructions and the bit string (B) respectively;
   determine translation data for translating the parts of the bit string into the reference machine instructions at the corresponding positions based on said comparison, wherein said translation data is associated with said processor circuit; and
   generate configuration data for configuring the processor circuit,
based on said translation data, wherein an instruction decoder of the processor circuit is configured to provide for translation of machine instructions from the bit string (B) into the reference machine instructions dependent on the translation data.

16. A non-transitory computer program product, to enhance the protection of applications executed in an open environments against reverse engineering and tampering, comprising a plurality of instructions, stored on a tangible medium, that is not a signal or a wave, for configuring a processor to be a virtual machine, emulated on another execution environment, wherein execution is obfuscated by layering at least one virtual machine, an inextricably link application and execution environment and embedding legal information openly into at least application code, said virtual machine and application data, said non-transitory computer program product when executed by said processor will cause said processor to:
   receive a bit string (B) and a program (P), said program defining a series of reference machine instructions associated with the processor; and
   divide the bit string (B) into successive parts that will be used by the processor as respective machine instructions;
   compare the reference machine instructions with the parts of the bit string (B) at corresponding positions in the series of reference machine instructions and the bit string (B) respectively;
   determine translation data for translating the parts of the bit string into the reference machine instructions at the corresponding positions based on said comparison, wherein said translation data is associated with said processor; and
   generate configuration data for configuring the processor with said translation data, wherein an instruction decoder of the processor being configured to provide for translation of machine instructions from the bit string (B) into the reference machine instructions dependent on the translation data.

* * * * *